W. G. LEWI.
SPEED CONTROLLING APPARATUS FOR MOTOR VEHICLES.
APPLICATION FILED MAR. 21, 1916.
1,212,153.
Patented Jan. 9, 1917.
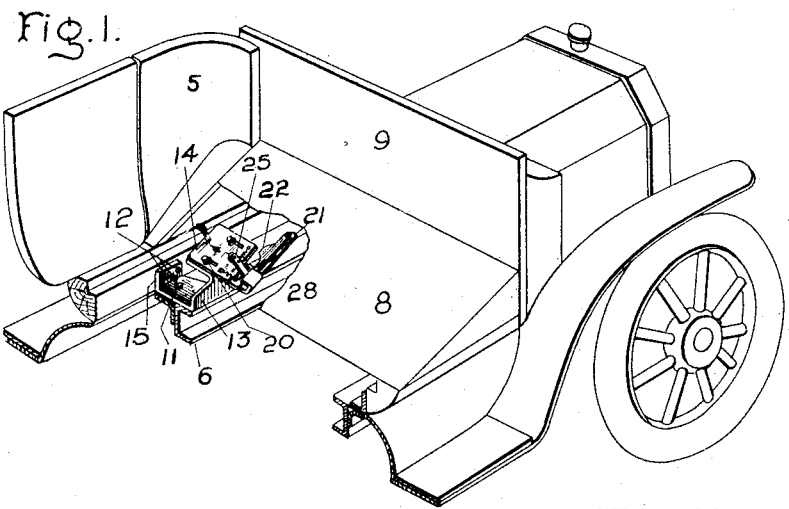
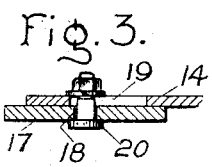
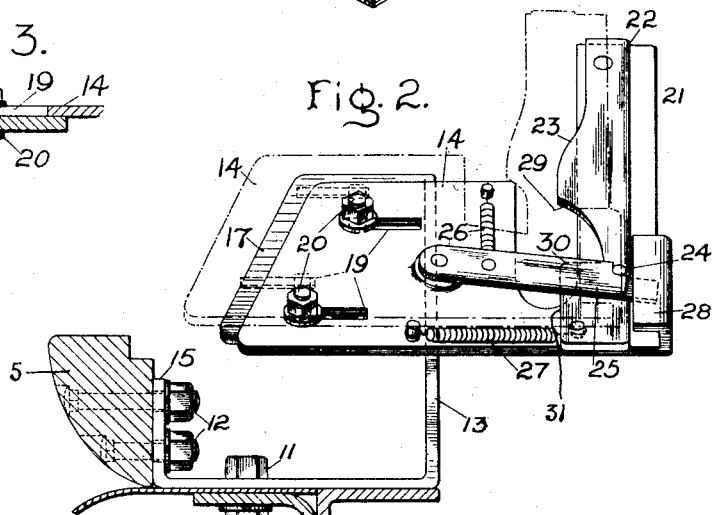
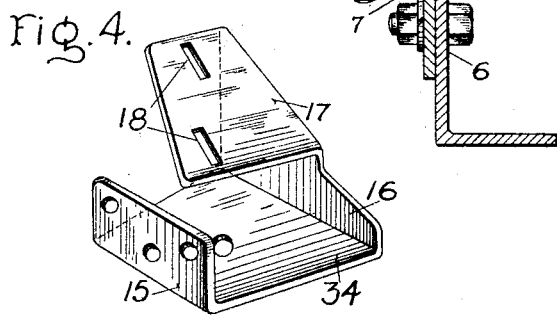
Inventor:
William G. Lewis,
by: [signature]
Attorneys.

UNITED STATES PATENT OFFICE.

WILLIAM G. LEWI, OF ALBANY, NEW YORK.

SPEED-CONTROLLING APPARATUS FOR MOTOR-VEHICLES.

1,212,153. Specification of Letters Patent. Patented Jan. 9, 1917.

Application filed March 21, 1916. Serial No. 85,556.

*To all whom it may concern:*

Be it known that I, WILLIAM G. LEWI, a citizen of the United States, residing in the city and county of Albany and State of New York, have invented certain new and useful Improvements in Speed-Controlling Apparatus for Motor-Vehicles; and I do hereby declare the following to be a full, clear, and exact description of the invention, such as will enable others skilled in the art to which it appertains to make and use the same.

This invention relates to speed controlling apparatus for motor vehicles and more particularly to apparatus for controlling and regulating the movements of the speed controlling pedal of the Ford type of automobile.

More specifically, the invention involves certain improvements upon the apparatus disclosed in United States Letters Patent No. 1,145,074, granted to me July 6, 1915.

In automobiles of the Ford type, the forward running of the vehicle is controlled by a foot pedal which may assume any one of three positions, namely, a neutral position wherein the clutch of the vehicle is disengaged, a forward position wherein the low speed gearing is made effective, and a rearward position wherein the high speed gearing is made effective. This controlling lever is actuated by a spring so that when it is released by the foot and by the other mechanism coacting with the lever, it will move to the high speed position. In my patent above referred to I disclosed mechanism for regulating the movements of this foot pedal adapted to define the neutral or intermediate position of the lever and arranged to insure operation of the lever in the intended manner. that is, such as to require that the lever be moved from the neutral position to the low speed position before it can be moved to the high speed position; the mechanism also involves the provision of means whereby the operator, by proceeding in a prescribed manner, may move the speed controlling lever from the neutral position directly to the high speed position when such direct movement is desired, as for instance, when the vehicle has been running down grade with the lever in the neutral position and it is desired to again couple the engine in driving relation to the vehicle through the high speed gearing.

The present invention involves the provision of numerous improvements in the construction of the devices described and claimed in the Letters Patent above referred to.

One of the features of the invention resides in the construction and arrangement of the parts whereby the application of the device to a Ford automobile is greatly facilitated. To this end, the base plate of the several levers employed is mounted upon a support which is specially formed to permit of readily mounting it upon the car so securely that all danger of its working loose or imposing too great a strain upon the parts of the car is eliminated. To this end, a support is provided which is bent in a peculiar manner so as to provide a surface properly located with respect to the floor of the car for the support of the base plate, and one or more other surfaces adapted to lie against the frame members of the car, as, for instance, the longitudinal side member of the chassis, so as to be secured rigidly thereto. The construction in this respect is such that in securing the device in position upon a Ford automobile, it is only necessary to remove a certain body bracket provided on the car for securing the body to the chassis, then place the support in the position previously occupied by the body bracket against a member of the chassis frame and then tighten up the nuts and bolts which were used to hold the body bracket in position. When the support is so secured in position, it performs the functions of the removed bracket and in addition serves as a support for the base plate of the controlling mechanism.

Another feature of the invention involves a provision for adjustability in any of several directions so that the base plate which is mounted on the support secured to the chassis frame may be readily positioned properly with respect to the pedal of the speed controlling mechanism. The surface on the support is inclined at the same angle as the floor of the car and lies directly below the floor; on it is placed the base plate forming the support for the levers which coact with the speed controlling lever so that this base plate lies directly under the floor of the car and parallel thereto. I have found that there is a substantial variation in the positions of the speed controlling pedals of different Ford cars with respect to the side members of the chassis frames, and that this variation is so great that a non-adjustable controlling member mounted on the chassis frame and adapted to coact with the speed controlling lever would not always be properly positioned with respect to the controlling lever. I have therefore made provision for adjusting the base plate with relation to the support and this preferably consists of slots formed in both of these members, those in one member being disposed at an angle to those in the other and bolts passing through these slots and adapted to secure the two parts together.

Another feature of the invention involves the provision of certain reinforcing devices for the levers of the controlling mechanism. The mechanism shown in my patent above referred to includes certain levers which are arranged to be actuated by the speed controlling lever of a Ford car and to govern the movements of that lever. I have found that the angle of the speed controlling lever relative to the coacting levers is such that it tends to raise the latter and impose undue strains upon the pivots thereof. I have therefore provided means for reinforcing those levers, consisting of a flange on the base plate turned over to overlie the end of the detent lever and receive the strain thrown upon it by the speed controlling lever so that none of this strain is imposed upon the pivots of the detent lever and the lever which is locked by the detent lever.

These and other features of the invention will be better understood by reference to the following description taken in connection with the accompanying drawings, which show the preferred embodiment of the invention.

In these drawings, Figure 1 is a perspective view of the forward portion of a Ford car having my improved mechanism applied thereto; Fig. 2 is a view of the mechanism in elevation showing a portion of the frame of the car in section; Fig. 3 is a detail view in transverse section showing the provision for adjustment of the base plate relatively to its support; and Fig. 4 is a perspective view on a smaller scale showing the support.

Referring to these drawings, 5 indicates the body of a Ford automobile mounted upon the frame 6 of the chassis. Within the body is a horizontal floor and forward of this an inclined floor 8 extending up to the dash 9. The speed controlling lever extends from the unit power plant up through a slot in the inclined floor 8 and is actuated by the foot of the operator. It has three positions, an intermediate position in which the clutch of the engine is disengaged, a forward position in which the low speed gear is operative, and a rearward position in which the high speed gear is operative. In securing the body of the car upon the chassis, a bracket is provided which is secured to the body 5 by means of three bolts 12; this bracket is secured by a bolt 11 to an angular member 7 which is secured to the frame member 6.

My improved controlling mechanism consists of a support 13 secured to the chassis frame 6 and body 5 and a base plate 14 mounted on the support and forming a base upon which the several levers which coact with the speed controlling lever are mounted. The support 13 consists of a piece of sheet-metal bent to the form illustrated in Fig. 4 and adapted to be substituted for the bracket above referred to and to be secured to the frame 6 and body 5 by the same bolts 11 and 12 provided on the car for holding the bracket in position. This support is provided with a horizontal portion 34 adapted to rest upon the horizontal flange of the frame member 6; at one edge of this horizontal portion 34 is a vertical portion 15 adapted to lie against the vertical wall of the lower portion of the body 5. At the opposite edge of the horizontal portion 34 is a vertical portion 16 at the upper edge of which is a portion 17 lying at an incline to the horizontal, similar to the inclination of the inclined floor 8 of the body. The horizontal and vertical members 34 and 15 of the support 13 are provided with openings which are spaced to correspond with the openings in the bracket originally provided and hence with the positions of the bolts 11 and 12. The support 13 is secured in position as shown in Fig. 2 by removing the nuts from the three bolts 12 and removing the bolt 11, whereupon the bracket may be removed and the support substituted therefor and secured in position by the same bolts 11 and 12 so that it performs the functions of the original bracket. In this way, the support may be rigidly mounted in position without requiring the provision of bolt holes additional to those originally provided on the car and without requiring additional devices.

The inclined surface 17 of the support receives the base plate 14 and holds the latter at the proper inclination parallel to and lying directly under the inclined floor 8 of the body of the car. On this base 14 are mounted the levers which coact with the speed controlling lever of the car, but as the speed controlling lever is not always at exactly the same distance from the side member of the chassis frame, provision is made for effecting an adjustment of the base plate 14 relatively to the support 13. To this end the inclined surface 17 of the support 13 is provided with parallel slots 18 and the base plate 14 is provided with parallel slots 19 disposed at a right angle to the slots 18. Bolts 20 pass through these slots 18 and 19 for securing the base plate to the support and before tightening the nuts on these bolts, the base plate may be moved relatively to the support to such position as may be found necessary in order that the levers carried by the base plate shall be in the positions required for proper coaction with the speed controlling lever of the car. The form of the bolt 20 is preferably that shown in Fig. 3, from which it will be seen that a portion of the shank of the bolt is squared and fits snugly within the slot in the portion 17 of the support so that the bolt 20 cannot turn while the nut is being tightened up thereon. Fig. 2 illustrates by the full lines and the dot and dash lines, two positions which the coacting slots permit the base 14 to occupy with respect to the support 13.

The base plate 14 is provided with an arm 21 on which is pivotally mounted a lever 22 whose edge is shaped to provide a projection, the sides 23 and 29 of which are curved to form cam surfaces, preferably as shown in Fig. 2. Beyond the curved edge 29 of the lever 22, that lever is provided with a wall 30 extending at a right angle to the length of the lever 22. On the lever 22 is a pin 24 which coacts with a notch in a detent lever 25 pivotally mounted upon a boss raised upon the base plate 14. This detent lever 25 is turned in one direction about its pivot by a spring 26 connected to the detent lever at one end and to a stud on the base plate at the other. The lever 22 is also spring-actuated, a spring 27 being provided connected at one end to a stud on the base plate and at the other to a stud on the lever 22. At one edge, the material of the base plate 14 is extended and bent up and over to provide a reinforcing guide flange 28 whose edge overlaps the free end of the detent lever 25.

The speed controlling lever of the car lies forward of the detent lever 25 and to the left of the lever 22. When this speed controlling lever is in the high speed position, the detent lever 25 is retracted and the edge 31 of lever 22 bears against the speed controlling lever. When the speed controlling lever is in the neutral position, the free end of lever 22 is drawn to the left by spring 27 so that the wall 30 of lever 22 is directly in rear of the speed controlling lever. The speed controlling lever cannot be moved from the neutral position rearward to the high speed position as the transverse wall 30 on lever 22 obstructs such movement. In order to move into the high speed position, it is necessary for the operator to first move the speed controlling lever forward toward the low speed position and during this movement that lever engages the edge 29 of lever 22 and turns lever 22 on its pivot against the tension of spring 27 until the stud 24 on lever 22 is carried opposite the notch in detent lever 25 and spring 26 actuates the detent lever to move it to locking position, in which it holds the lever 22 in the position in which that lever is shown in Fig. 2. Then the operator may allow the speed controlling lever to be moved by its spring to the high speed position, for its rearward movement would not be arrested by the transverse wall 30 since the free end of lever 22 is then to the right of the path of movement of the speed controlling lever. However, when the speed controlling lever moves into this high speed position, its end engages the detent lever 25 and moves that detent lever against the tension of spring 26 to the position for releasing the stud 24 and lever 22 is turned by its spring 27 until its edge 31 bears against the side of the speed controlling lever so that on a subsequent movement of the speed controlling lever to the neutral position, the parts will be restored to their former positions. The length and shape of the surfaces 29 and 23 on the lever 22 are such that by proceeding in a prescribed manner it will be possible for the operator to move the speed controlling lever into the high speed position without first moving it into the low speed position. This is desirable in some cases, as for instance, when the car has been coasting down hill and it is desired to again couple the engine in driving relation to the car without first rendering the low speed gear operative. To do this, it is only necessary for the operator to move the speed controlling lever a short distance toward the low speed position during which movement the lever coacts with the curved surface 29 on the lever 22 so as to turn lever 22 to the retracted position in which it is locked by the detent 25. When in this position, the lever 22 will not obstruct movement of the speed controlling lever directly rearward to the high speed position.

With the parts mounted on a Ford car in the manner shown in Fig. 1, the speed controlling lever lies at such an angle to the lever 22 that it tends to raise the free end thereof and this imposes a strain upon the pivot of lever 22. To guard against such strain distorting the parts and possibly injuring them, the flange 28 is provided extending over the free end of the detent lever so that this flange receives the strains and prevents upward movement of the levers 22 and 25.

The construction above described is such as to facilitate the application of the device to a Ford car. The device may be rigidly secured to the frame of the car with the expenditure of but little time and effort and without requiring the use of additional securing devices or the provision of bolt holes in the parts of the car itself. Also, the parts may be adjusted relatively so as to compensate for variations which occur in different Ford cars in the distance between the side member of the frame and the speed controlling lever. Furthermore, provision is made by the shape given to the lever 22 for retracting that lever to a position in which it does not obstruct rearward movement of the speed controlling lever without first moving the speed controlling lever into the low speed position when such movement of the speed controlling lever is made desirable by the conditions under which the car is being operated.

I claim:

1. The combination with a Ford automobile of a support, means for securing the support to the inner side of a side-member of the frame of the car with the support extending inwardly of the frame from said side-member, a base mounted on the support in an inclined position directly under the inclined floor of the body of the car, and devices mounted on said base and coacting with the speed controlling lever of the car to control the movements of said lever; substantially as described.

2. In a Ford automobile, a support having a horizontal wall adapted to be secured to the frame of the car, a vertical wall at one edge of the horizontal wall adapted to be secured to the body of the car, a vertical wall at the opposite edge of the horizontal wall, and an inclined wall at the upper edge of the last named vertical wall, a base mounted upon the inclined wall directly below and parallel to the inclined portion of the floor of the car, and devices mounted on said base and coacting with the speed controlling lever of the car to control the movements of said lever; substantially as described.

3. In a Ford automobile, a support adapted to be secured to the frame of the car and provided with an inclined supporting surface, a base mounted upon the inclined surface of the support directly below and parallel to the inclined portion of the floor of the car, means for securing the base to the inclined portion of the support permitting adjustment of the position of the base relatively to the support, a spring actuated notched lever pivotally mounted upon the support in position to coact with the speed controlling lever of the car, and a spring actuated detent for said lever pivotally mounted upon the base and extending across the path of movement of the speed controlling lever of the car so as to be actuated thereby; substantially as described.

4. In a Ford automobile, a support having a horizontal wall adapted to be secured to the frame of the car, a vertical wall at one edge thereof, and an inclined wall at the upper edge of said vertical wall provided with two parallel slots, a base resting upon the said inclined wall and provided with parallel slots disposed at an angle to the slots in said inclined wall, bolts passing through the slots in the inclined wall and the base for securing the base to the support in various positions of adjustment, a spring actuated notched lever pivotally mounted upon the support in position to coact with the speed controlling lever of the car, and a spring actuated detent for said lever pivotally mounted upon the base and extending across the path of movement of the speed controlling lever of the car so as to be actuated thereby; substantially as described.

5. A controlling mechanism for the speed controlling lever of a Ford automobile comprising a base, a spring actuated lever pivotally mounted thereon and provided with a notch adapted to coact with the speed controlling lever, a spring actuated detent pivotally mounted upon the base in position to coact with said lever and adapted to extend across the path of movement of the speed controlling lever, and a flange on the base extending over the free end of the detent to prevent upward movement of the spring actuated lever and the detent effected by the speed controlling lever of the car; substantially as described.

6. A controlling mechanism for the speed controlling lever of a Ford automobile comprising a base, a locking lever pivotally mounted thereon and having a notch in one side thereof, a spring connected to the locking lever for turning it on its pivot to carry its notched edge into engagement with the speed controlling lever, and a spring actuated detent pivotally mounted upon the base, one side wall of the notch in said locking lever being so shaped that the lever may be moved into position to coact with the detent by a short movement of the speed controlling lever which does not carry the speed controlling lever out of its neutral position in which position it lies in the slot in said locking lever; substantially as described.

In testimony whereof I affix my signature.

WM. G. LEWI.

Copies of this patent may be obtained for five cents each, by addressing the "Commissioner of Patents, Washington, D. C."